United States Patent
Brunswig et al.

(10) Patent No.: US 8,370,400 B2
(45) Date of Patent: Feb. 5, 2013

(54) SOLUTION-SPECIFIC BUSINESS OBJECT VIEW

(75) Inventors: Frank Brunswig, Heidelberg (DE); Jens Freund, Heidelberg (DE); Thomas Gros-Bölting, Walldorf (DE); Michael Hartel, Heidelberg (DE); Adam Polly, Stutensee-Blankenloch (DE); Thomas Schneider, Heidelberg (DE); Otfried von Geisau, Sinsheim (DE)

(73) Assignee: SAP AG, Walldorf (DE)

( * ) Notice: Subject to any disclaimer, the term of this patent is extended or adjusted under 35 U.S.C. 154(b) by 189 days.

(21) Appl. No.: 12/838,636

(22) Filed: Jul. 19, 2010

(65) Prior Publication Data

US 2012/0016894 A1 Jan. 19, 2012

(51) Int. Cl.
*G06F 17/30* (2006.01)
(52) U.S. Cl. ........................... 707/803; 707/808
(58) Field of Classification Search .......... 707/791–793, 707/802, 808, 803, 999.1–999.101
See application file for complete search history.

(56) References Cited

U.S. PATENT DOCUMENTS

| | | | | |
|---|---|---|---|---|
| 5,717,925 A * | 2/1998 | Harper et al. | | 1/1 |
| 6,407,761 B1 * | 6/2002 | Ching et al. | | 715/835 |
| 7,124,400 B2 * | 10/2006 | Mortensen et al. | | 717/121 |
| 7,480,920 B2 * | 1/2009 | Brendle et al. | | 719/320 |
| 8,027,997 B2 * | 9/2011 | Conn et al. | | 707/793 |
| 2006/0225032 A1 * | 10/2006 | Klerk et al. | | 717/105 |
| 2006/0230066 A1 * | 10/2006 | Kosov et al. | | 707/104.1 |
| 2006/0282448 A1 * | 12/2006 | Schneider et al. | | 707/101 |
| 2010/0161675 A1 | 6/2010 | Ritter et al. | | |
| 2010/0280863 A1 * | 11/2010 | Wilcock et al. | | 705/7 |

* cited by examiner

*Primary Examiner* — Robert Timblin
(74) *Attorney, Agent, or Firm* — Buckley, Maschoff & Talwalkar LLC

(57) ABSTRACT

A computer-implemented system may include one or more storage devices storing first metadata defining an instance of a first metaobject, second metadata defining an instance of a solution supplement metaobject, wherein the second metadata comprises annotations to the first metadata, and wherein the first metaobject and the solution supplement metaobject are instances of a meta-metaobject. Also stored is executable program code of a service to determine merged metadata based on the first metadata and the annotations to the first metadata. A processor is included to execute the executable program code.

18 Claims, 12 Drawing Sheets

SOLUTION-SPECIFIC BUSINESS OBJECT VIEW

FIELD

Some embodiments relate to enterprise services based on business objects and supported by an application platform. More specifically, some embodiments relate to solution-specific views on business objects to facilitate development of business applications using an application platform.

BACKGROUND

A business object is a software model representing real-world items used during the transaction of business. For example, a business object may represent a business document such as a sales order, a purchase order, or an invoice. A business object may also represent master data objects such as a product, a business partner, or a piece of equipment. Particular ones of such master data objects (e.g., SalesOrder SO435539, ACME corporation) are represented by instances of their representing business object, or business object instances.

A business object may specify business logic and/or data having any suitable structure. The structure of a business object may be determined based on the requirements of a business scenario in which the business object is to be deployed. A business application for a particular business scenario may require many business objects, where the structure of each business object has been determined based on the requirements of the particular business scenario.

A business process platform, or application platform, typically exposes a complex business object model. The business object model describes many business objects, their relations and dependencies. The business object model may be used by several business applications, or solutions, to access data and logic of business object instances. The applications, in turn, provide such data to end-users through user interfaces, reports, etc.

An application platform is typically intended as a basis for different business solutions applicable for small-, medium-, and large-sized companies. In order to provide all the business functionality required by these target groups, the business objects of the platform's business object model may contain more functionality than is required by a business solution sold to small- and medium-sized companies.

Moreover, the business objects of a typical application platform are modeled and implemented in a strictly normalized way focused on service provisioning. These normalized business objects are typically not designed in order to facilitate their manipulation and use by a customer. A business object model also contains many entities which are for internal use by the platform developer.

For at least the foregoing reasons, it is not desirable to directly expose a customer to a business object model of an application platform. The complexity of the business object model may provide flexibility in developing applications, but a customer is primarily focused on use-case specific views, including joined data of other business objects, which may be used by the customer to develop user interfaces, forms, agents, or analytics.

DETAILED DESCRIPTION

Figure 1:
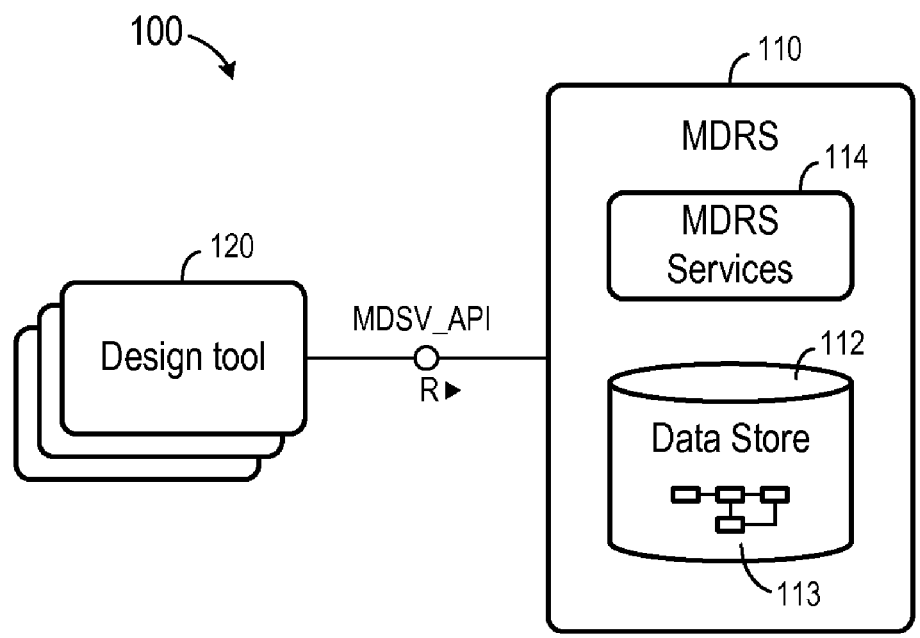
FIG. 1 is a general block diagram of a design time architecture according to some embodiments.

FIG. 1 is a block diagram of system 100 according to some embodiments. FIG. 1 represents a logical architecture for describing some embodiments, and actual implementations may include more or different components arranged in any manner. System 100 may be implemented using any number of computer devices, metadata models, object models and model instances may be embodied in any types of electronic data structures, and one or more processors may execute program code to perform processes described herein.

System 100 includes metadata repository (MDRS) 110, which in turn includes data store 112 and MDRS services 114. MDRS 110 may be implemented in an application platform as is known in the art. Data store 112 includes metadata of various metadata models 113. For purposes of the foregoing description, these metadata models 113 will be referred to as metaobjects 113 which are defined by metadata.

Metaobjects 113 may include generic models of a BI view, a floorplan (i.e., a user interface layout), a business object, user interface text, a solution supplement, and a solution, but embodiments are not limited thereto. An instance of a business object metaobject, for example, may comprise a SalesOrder object model or an Organization object model. The metaobjects may be embodied in any type of data structure, including but not limited to eXtensible Markup Language files.

As mentioned above, metadata defining the specific metaobjects are stored in data store 112. As in the conventional storage of object instance data, the metadata defining the specific metaobjects may be stored in database tables and/or any other suitable format.

Each of metaobjects 113 may comprise an instance of a same meta-metadata model (or meta-metaobject). The meta-metaobject may consist of nodes, composite associations, associations, elements structure and attribute properties. Development of specific business object metaobjects, specific solution supplement metaobjects, etc. may therefore proceed using the same development technologies. Moreover, access and lifecycle issues of the various specific metaobjects may be managed using similar (or identical) mechanisms.

For example, system 100 also includes one or more design tool 120. As illustrated, design tool(s) 120 use a Meta Data Solution View (MDSV) API to access views of metaobjects 113. MDRS services 114 may include program code executable to implement the MDSV API.

Figure 2:
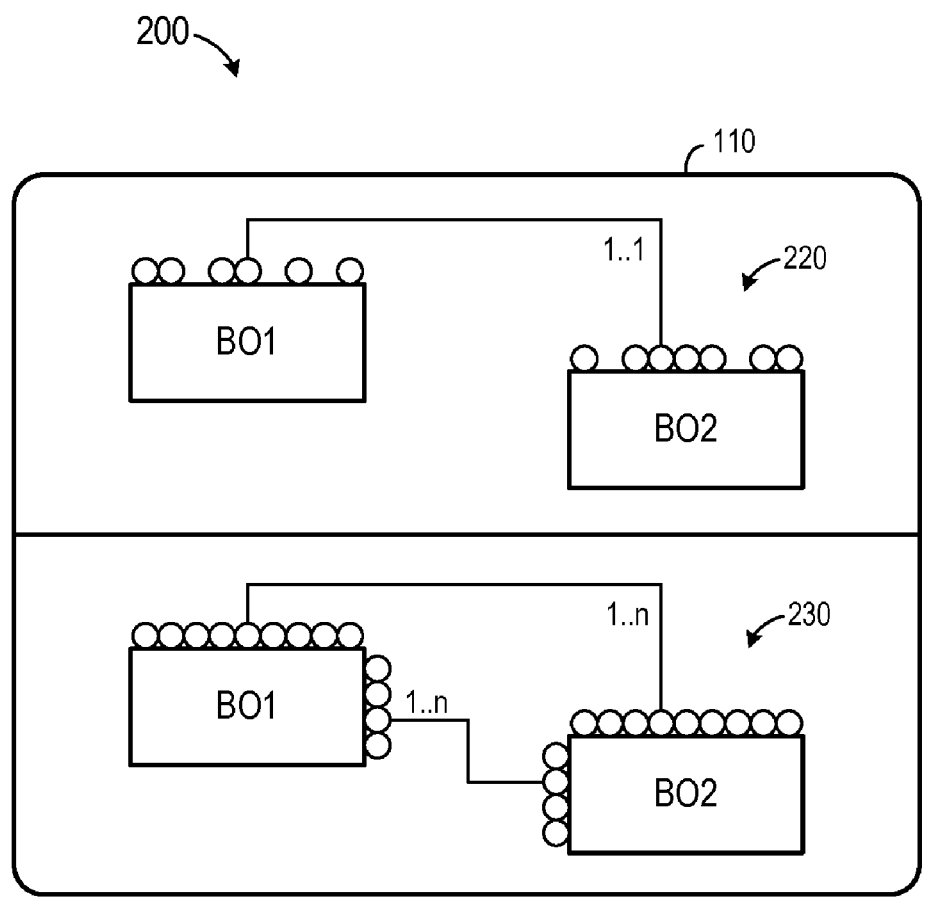
FIG. 2 is a block diagram illustrating a system according to some embodiments.

The view of a metaobject 113 provided to design tool(s) 120 may comprise a simplified view of the metaobject 113. For example, FIG. 2 illustrates design-time model hierarchy 200 within MDRS 110 according to some embodiments. Platform model 220 may comprise a conventional platform model such as that described above. Platform model 220 shows business object metaobjects BO1 and BO2, although embodiments are not limited to simplified views of business object metaobjects.

Simplified model 230 may comprise solution-specific views of BO1 and BO2 of platform model 220, and may provide features to facilitate the development of business applications (i.e., solutions) having some common requirements. Simplified model 230 may be used in place of platform model 220 during development of all business applications (i.e., service consumers) such as, but not limited to a user interface layer, Web services (i.e., Compound Services), and forms.

Simplified model 230 may reflect a determination of which entities (e.g., nodes/attributes, etc.) or combinations of entities are often required by an application for proper functioning of the relevant business objects. The features of a simplified model 230 described herein benefit a user during design-time. The user can be a developer on the application side, a partner, or the customer (e.g., adding extension fields to a screen). During runtime, an application developed using simplified model 230 typically interacts with an application platform without regard to simplified model 230.

MDRS services 114 may calculate a simplified view of a metaobject instance (e.g., a SalesOrder Object model) by filtering based on properties of the metaobject instance, additional properties and solution-specific supplementary annotations, and use-case specific heuristics. The MDSV API may therefore be used by any design-time tool to access a business object metaobject. The API may support filter parameters to allow the calculation of different business object views for different use-cases (e.g., partner development, customer extensibility, SAP in-house development, etc.).

Annotations according to some embodiments include, but are not limited to, a release status code (such as those described in commonly-assigned, co-pending U.S. application Ser. No. 12/639,698), a relevant for solution indicator defining whether the element is published for customers of a given solution, a special element path, a public write access indicator, a source foreign key path, a code extension supported indicator, a determined by system indicator, a transformation rule annotation, an allowed code values per usage annotation, and an action usage code.

The API may implement rules to calculate business object views based on such annotations. For example, a calculated view of a metaobject instance may only include non-disabled entities, entities which are marked as released or deprecated (e.g., using a release status code annotation), and/or entities which are marked as public (e.g., using a relevant for solution indicator annotation).

In other examples of calculation rules, a view according to some embodiments includes a reduced-depth object tree. For example, the reduced-depth object tree might hide all or some cross-business object associations. Also or alternatively, the reduced-depth object tree might hide all or some 1:C associations.

Simplified metaobject instance views according to some embodiments include elements of 1:C associations together with elements of parent nodes (e.g., by merging the 1:C association paths into the element tree of the parent node). In some embodiments, only node elements are joined in the parent nodes, while actions, queries, associations, and other entities are not handled in this manner. A calculated view may show only the relevant elements and not all elements in the case of navigation association-specific reduction of the target node. Transformation definitions and user interface texts of transformed fields may also be included according to some embodiments.

According to some embodiments, additional properties and solution-specific annotations for a metaobject instance are maintained by a separate "solution supplement" metaobject (e.g., MDRS_BO_SOLUTION_SUPPLEMENT) which is associated with the metaobject in MDRS 110. These annotations may be associated with one or more elements (Root, Node, Node Element, Association, Action, Action Parameter Element, Status Schema, Query, Query Parameter Element) of the metaobject instance.

Specific annotations according to some embodiments will now be described. Embodiments are not limited to the described annotations.

A Public Write Access indicator may indicate whether an associated entity may be written to. In some embodiments, the public write access indicator does not override other platform restrictions. In other words, the public write access indicator can be set to "Yes" only if write access to the entity is not otherwise restricted.

An Action Usage Code annotation may have values of Default Usage, Internal Check Action, Action Only Callable by Inbound Agent, and Action only callable by Outbound Agent. Actions specified as Default Usage are typically part of the user interface and may be exposed in the calculated view. Actions with an Internal Check Action code are not exposed, and are only called internally by the instance of the metaobject itself. Actions having the codes Action Only Callable by Inbound Agent and Action Only Callable by Outbound Agent are usually not exposed in the calculated view. They may be closely related to process consistency.

The Code Extension Supported Annotation is relevant for a node element but may also be a characteristic of the data type.

In many cases all released elements of a target node of an association are visible in the calculated view. Accordingly, the same elements which are visible during navigation of the composition association are also relevant during navigation of via another association. The Special Element Path annotation allows restriction of a view depending on the association from which navigation began.

An element path is either directly an element of a target node of a first association, or it is an element of a node which can be reached via associations of the target node (or associations of their target nodes, etc.). In case no user interface text is specified in the special element path, the user interface text of the element is considered valid.

Example A with special element path:

The metaobject instance SalesOrder includes a 1:C association BUYER_PARTY at the root node. Assuming a request to view all fields which are visible on the QAF, and only two fields are visible on the QAF (even though the party includes many more fields), a list of special element paths may be defined:

```
PARTY_KEY---PARTY_ID---CONTENT with UI Text "Account ID"
USED_ADDRESS---FORMATTED_ADDRESS---
FORMATTED_NAME
``` with UI Text "Account"

Example B without special element path:

The metaobject instance SalesOrder includes a 1:C association to the DO ATTACHMENT FOLDER. The DO attachment folder includes details (nodes, fields, actions, . . . ) which are published in the solution. Since all business objects in the solution use the attachment folder always in the same way, no special view is needed. The association is included in the view without overwriting the default using a special element path.

Example C with truncated special element path:

The metaobject instance SalesOrder includes a 1:C association BUYER_PARTY at the root node. All the fields of the UI-Building Block of the Address are desired for inclusion in the view, but not all the fields of the party node. The BO Used Address is annotated as described herein so that all the fields of the UI-Building Block are included, and the special element path is defined:

```
PARTY_KEY---PARTY_ID---CONTENT with UI Text "Account ID"
USED_ADDRESS
```

For a released implemented association or cross-DU association, a Source Foreign Key Path annotation indicates to which elements (e.g., ID, code value) the association is actually pointing.

The Determined by System Indicator describes whether application logic exists for determining the value of this node element. If this indicator is set, documentation may be provided to explain how this determination works (e.g. "This value is defaulted based on the field xyz at the customer master".)

The Transformation Rule annotation is to derive a transformed element out of a given core business object element without adding a new transformed element to the core business object. The user interface text of the transformed field may be maintainable as well, so that the customer or key user is able to find the correct transformation.

The Allowed Code Values per Usage annotations specifies which of the code values of the code list provider are actually allowed for the associated business object element. This annotation may be solution-independent.

A solution supplement metaobject maintains solution-specific annotations for its corresponding metaobject. For each business object metaobject instance (e.g., SalesOrder) used in a solution, a corresponding solution supplement metaobject instance exists. This solution supplement metaobject instance contains only additional content associated with the solution context.

The solution supplement metaobject refers to the relevant entities of the business object metaobject and the UI Text metaobject via associations. The content for the solution can be maintained in a software layer other than that of the corresponding business object metaobject, which implies that the solution content shall be transportable as separate development unit.

In order to support more than one solution within a given application platform, a "solution" metaobject (e.g., MDRS_SOLUTION) is also available in MDRS 110. An instance of the solution metaobject describes a specific solution, such as those known in the art. Each instance of the solution supplement metaobject has a foreign key association to a specific solution metaobject instance. The solution key is part of a solution supplement alternative key to ensure that more than one solution can be maintained in one application platform.

Figure 3:
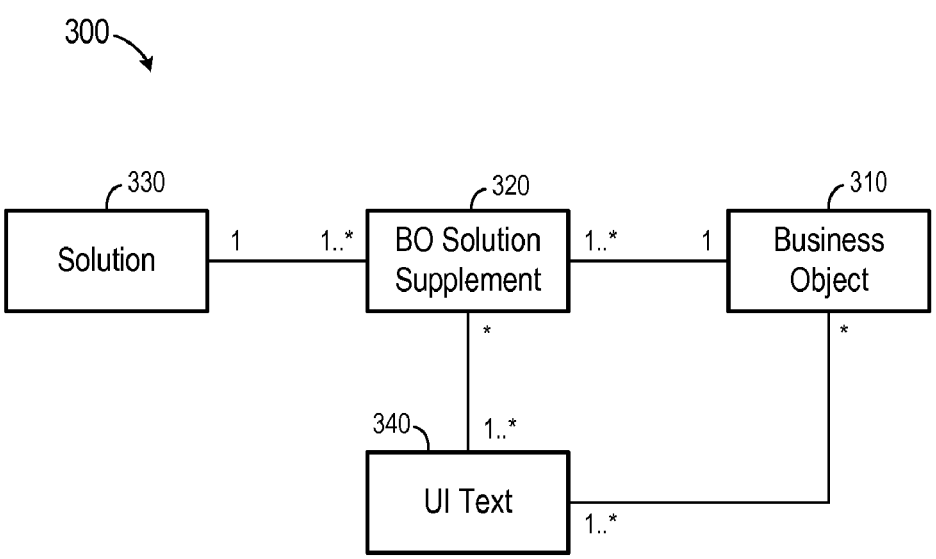
FIG. 3 is a map of relationships between metaobject models according to some embodiments.

FIG. 3 shows relationships 300 between four metaobjects (Solution 330—BO Solution Supplement 320—Business Object 310—UI Text 340) of MDRS 110. Instances of BO Solution Supplement metaobject 320 contain only the solution-specific annotations for instances of Business Object 310, and do not provide the simplified views of business object instances described above. BO Solution Supplement metaobject 320 also includes associations to UI Text metaobject 340 to support the layering and overwriting of UI Texts in the solution layer.

Solution Supplement metaobject 320 may provide the maintenance of annotations for specific instances of metaobjects in addition to business objects. In some embodiments, a separate solution supplement metaobject may be provided for each metaobject in MDRS 110

Figure 4:
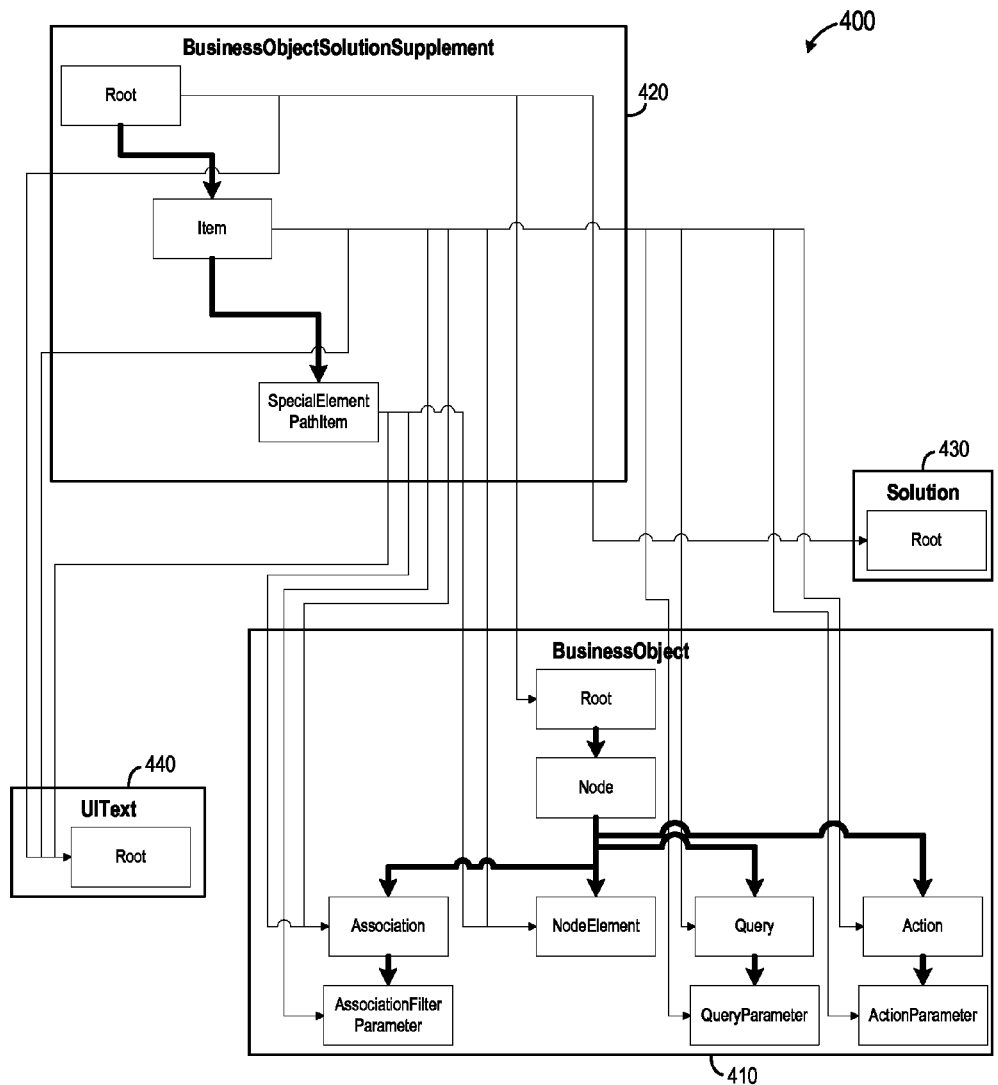
FIG. 4 is a model of a solution supplement metaobject according to some embodiments.

FIG. 4 shows model 400 of BO Solution Supplement metaobject 420 according to some embodiments. The Root node of BO Solution Supplement metaobject 420 has associations to Solution metaobject 430, to UI Text metaobject 440 to define a solution-specific terminology, and to a corresponding Business Object metaobject 410. All annotations for business object entities are described in the Item node of BO Solution Supplement metaobject 420.

The Item node has an association to UI text metaobject 440 if the text is overwritten by the solution. The Item node also includes associations to the corresponding business object entities association, node, node action, node query, node element, etc. Each Item node instance includes the annotations for exactly one corresponding business object entity.

Some embodiments provide for the removal of technical and unnecessary associations from a business object view by specifying an annotation on the association. On the other hand, it may be useful to join information of other business objects into Business Object metaobject 410. For example, the address information of a buyer in a sales order may be made visible in the simplified sales order view even though this address information is not currently part of the SalesOrder business object.

Some embodiments provide definition, by virtue of BO Solution Supplement metaobject 420, of a special element path based on associations to a cross-business object node or cross-business object node element which is merged with the current business object view metadata. The end of the special element path can either be a node element or an association. If the end is an association, all released entities of the target node of the association including node elements, node actions, and associations from this target node may be visible in the business object view. If the end of the special path element is a node element, then only the element may be visible in the business object view.

Figure 5:
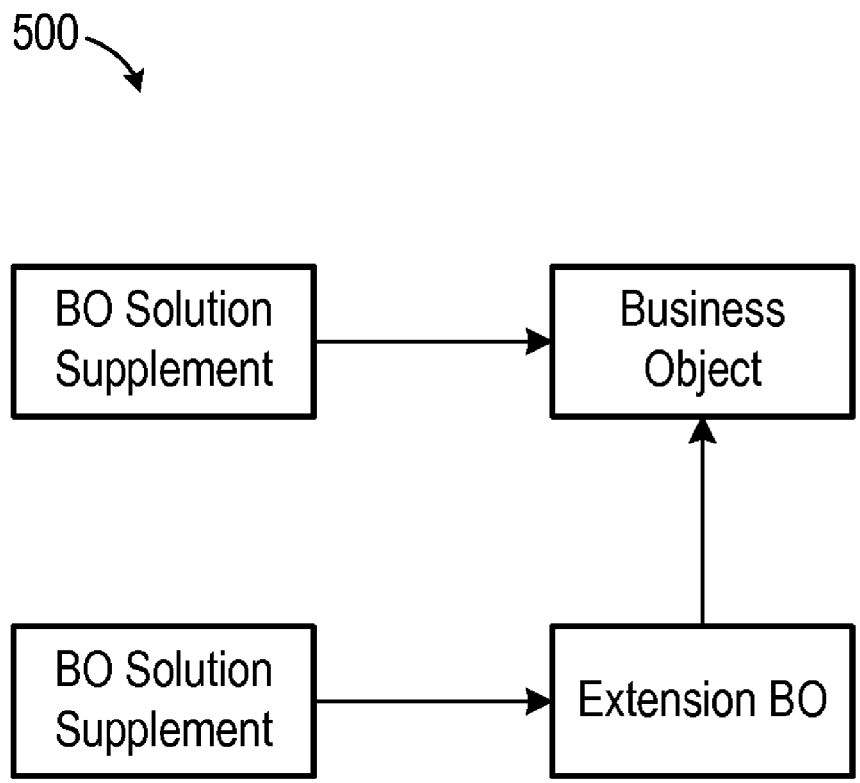
FIG. 5 is a map of relationships between metaobject models according to some embodiments.

Extensibility for Business Object instances is supported by an Extension BO metaobject of MDRS 110. Multiple Extension BO instances can exist for each Business Object instance. A BO Solution Supplement instance may exist for each Extension BO instance. Relationship 500 of FIG. 5 illustrates one possible scenario based on these parameters.

The content of an Extension BO instance is additive and the content of the corresponding BO Solution Supplement instance can contain additional information for the Extension BO items. Some embodiments do not allow a BO Solution Supplement instance corresponding to an Extension BO to overwrite items of a BO Solution Supplement instance of the source Business Object. In some embodiments, BO Solution Supplement instances for more than one solution may be present in one system. Usage of a solution key allows for the maintenance and reading of the appropriate solution-specific metadata.

Figure 6:
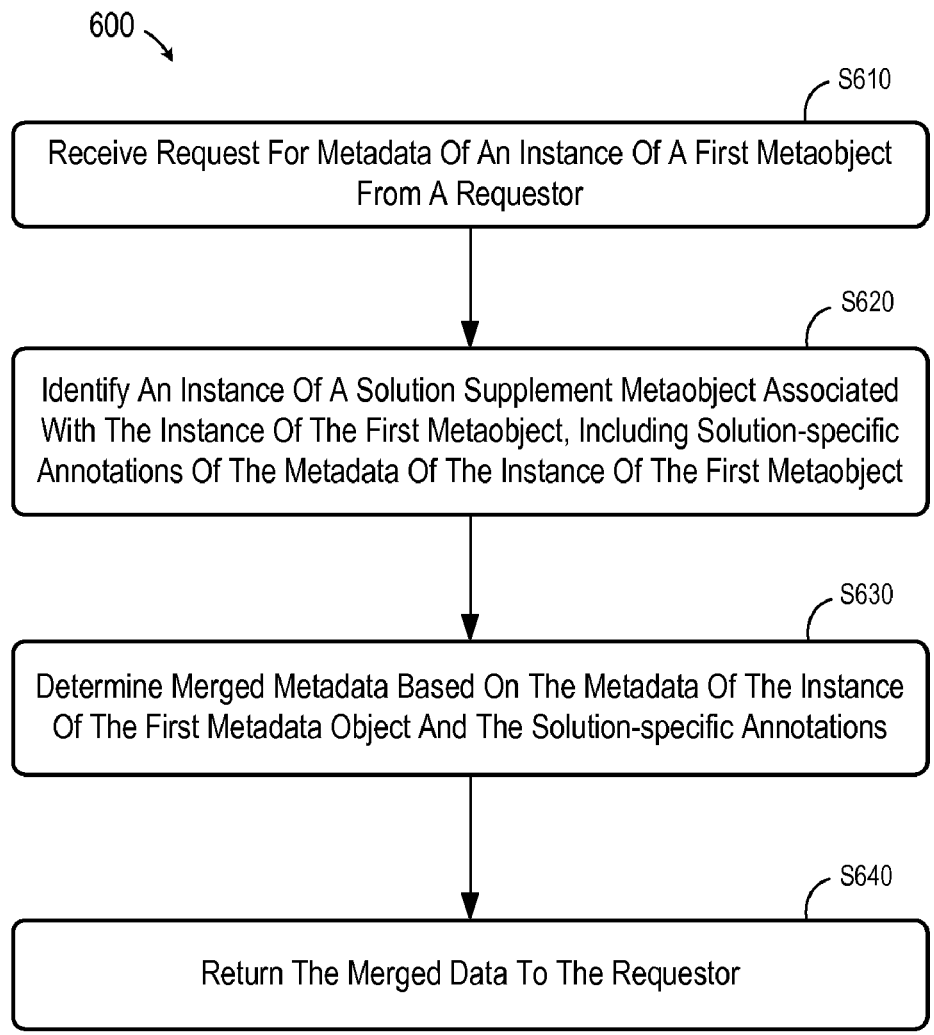
FIG. 6 is a flow diagram of a process according to some embodiments.

FIG. 6 includes a flow diagram of process 600 according to some embodiments. MDRS services 114 may execute process 600 to provide a simplified view of a metaobject instance according to some embodiments. All systems and processes discussed herein may be embodied in program code stored on one or more computer-readable media and executed by a processor. Such media may include, for example, a floppy disk, a CD-ROM, a DVD-ROM, a Flash drive, magnetic tape, and solid state RAM or ROM memories. Embodiments are therefore not limited to any specific combination of hardware and software.

Initially, at S610, a request for metadata of an instance of a first metaobject is received from a requestor. For example, a design tool 120 may call the MDSV API to request metadata of a SalesOrder business object. Next, at S620, an instance of a solution supplement metaobject associated with the instance of the first metaobject is identified. As described above, the identified instance of the solution supplement metaobject includes solution-specific annotations of the metadata of the instance of the first metaobject.

Merged metadata is determined based on the annotations and on metadata of the instance of the first metaobject at S630, and the merged metadata is returned to the requestor at S640. Determination of the merged data according to some embodiments will be described in detail below.

The merged metadata is typically a subset of the metadata of the instance of the first metaobject. The merged metadata may be used by the requestor to present a simplified denormalized view on the instance of the first metaobject.

FIGS. 7 through 10 are screenshots illustrating the structure of the solution metaobject and the solution supplement metaobject according to some embodiments. In some embodiments, the solution metaobject and the solution supplement metaobject are instances of a same meta-metaobject.

Figure 7:
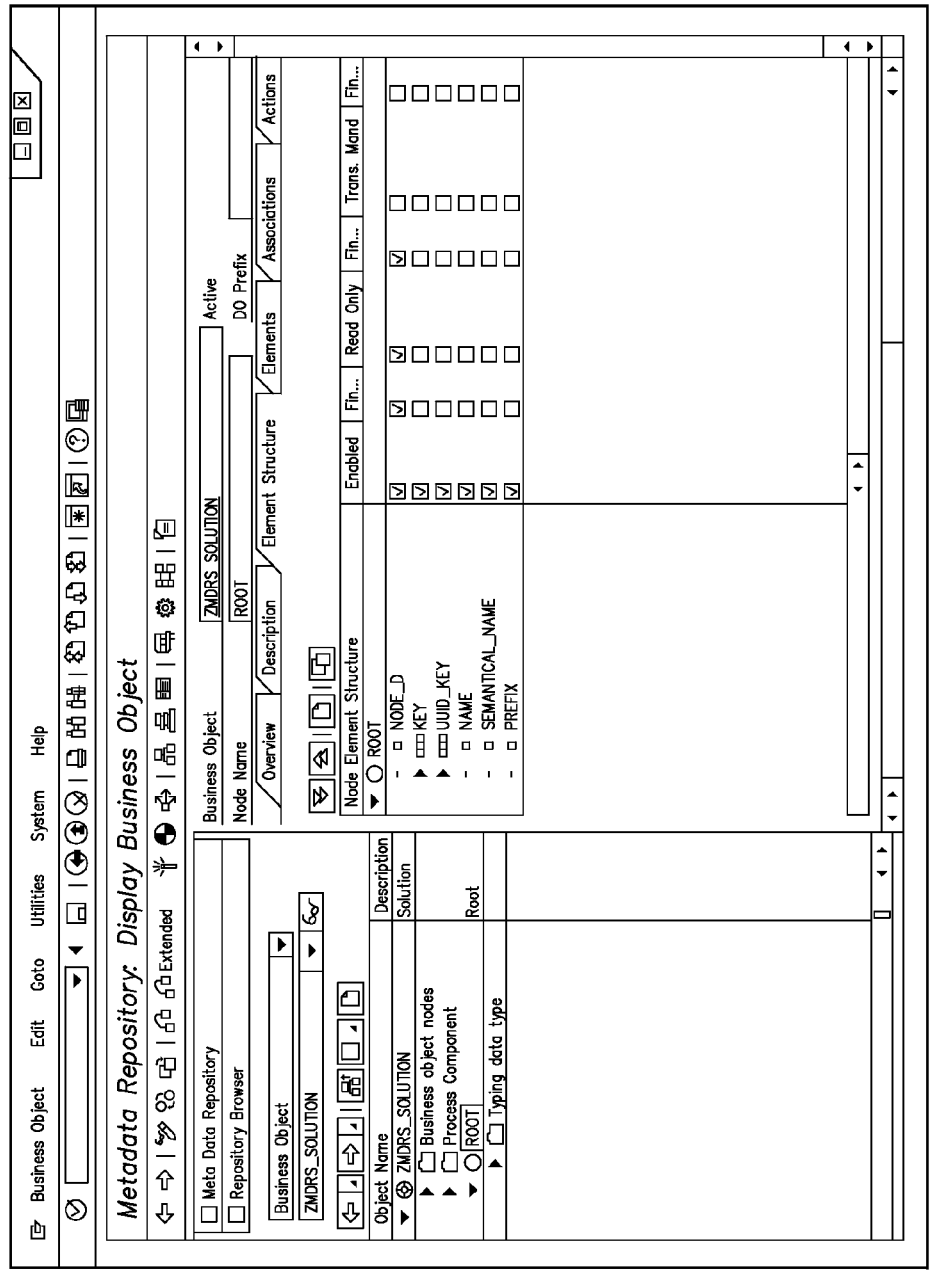
FIG. 7 is an outward view of a user interface showing a Root node of a solution metaobject according to some embodiments.

As shown in user interface 700 of FIG. 7, the elements located directly at the node Root of the Solution metaobject are defined by the data type SolutionElements. These elements include: Name (e.g., the name of the solution); SemanticalName (e.g., the semantical name of the solution); and PrefixName (e.g., the prefix or ABAP namespace of the solution).

Figure 8:
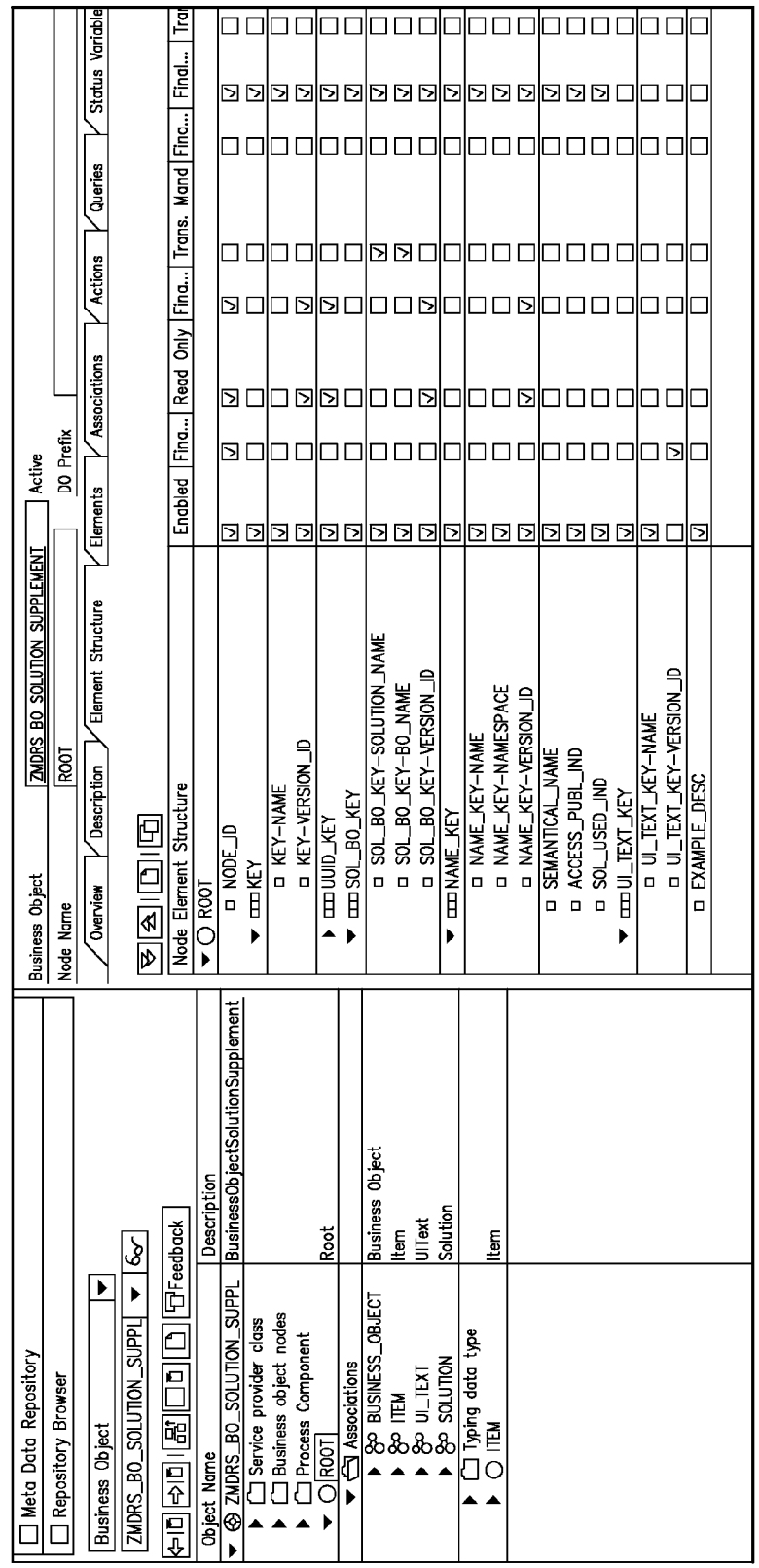
FIG. 8 is an outward view of a user interface showing a Root node of a solution supplement metaobject according to some embodiments.

User interface 800 of FIG. 8 illustrates elements of a Business Object Solution Supplement metaobject according to some embodiments. The elements located directly at the node Root of the Solution Supplement metaobject are defined by the data type SolutionSupplementElements. These elements include: SolutionBusinessObjectKey (e.g., key defined by the solution name and the business object name; SolutionProxyName (e.g., the proxy name of the solution to which the solution supplement belongs; and BusinessObjectProxyName (e.g., the proxy name of the business object to which the solution supplement belongs). In this regard, one Solution Supplement instance is associated with only one Business Object and only one Solution. The elements of the Business Object Solution Supplement metaobject also include the annotations AccessPublishedIndicator and SolutionUsedIndicator.

Figure 9:
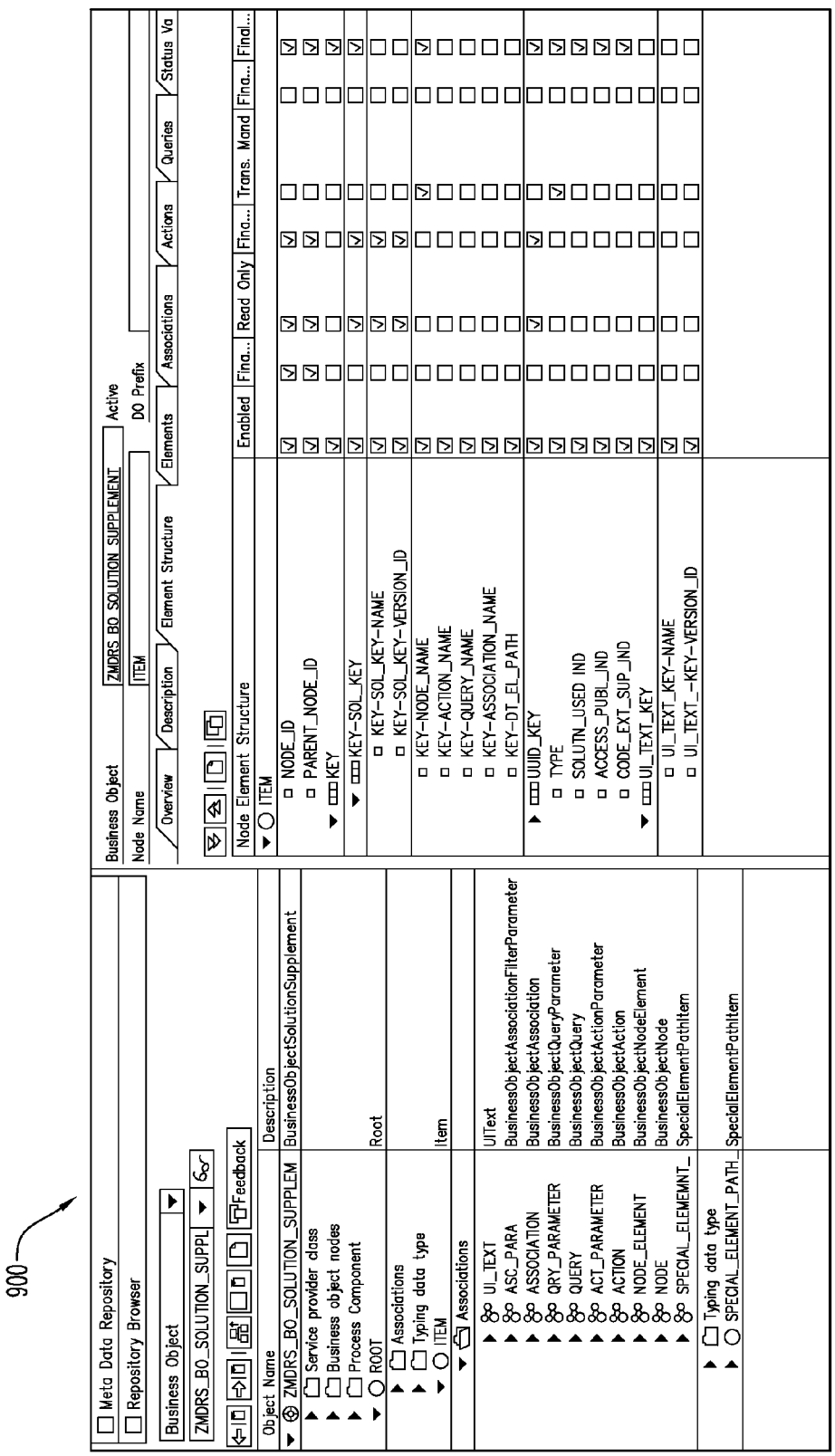
FIG. 9 is an outward view of a user interface showing an Item node of a solution supplement metaobject according to some embodiments.

The Item Node of the Business Object Solution Supplement metaobject, illustrated in user interface 900 of FIG. 9, includes associations to all Business Object entities for which annotations are available.

The elements located directly at the node Item are defined by the data type SolutionSupplementItemElements. These elements include: Key (e.g., the key of the item of the business object solution); SolutionSupplementKey: (e.g., the key of the business object solution supplement to which the item belongs; NodeProxyName: (e.g., the proxy name of the business object node); ActionProxyName: (e.g., the proxy name of the business object action); QueryProxyName: (e.g., the proxy name of the business object query) AssociationProxyName: (e.g., the proxy name of the business object association); DataTypeElementPathProxyName: (e.g., the data element path of the element proxy names of the corresponding business object entity); and TypeCode: (e.g., the coded representation of the item type—either Business Object Node, Business Object Node Element, Business Object Action, Business Object Action Parameter, Business Object Query, Business Object Query Parameter, Business Object Association, Business Object Association Filter Parameter).

Elements associated with annotations include: SolutionUsedIndicator: (e.g., indicates whether the corresponding business object entity is used in the solution or not); AccessPublishedIndicator: (e.g., indicates whether the corresponding business object entity was published of the solution for access or not); and CodeExtensionSupportedIndicator: (e.g., indicates whether the corresponding business object entity supports code extensibility or not). In some embodiments, the CodeExtensionSupportedIndicator is only available for the types "Node Element", "Action Parameter", "Query Parameter", or "Association Filter Parameter".

Figure 10:
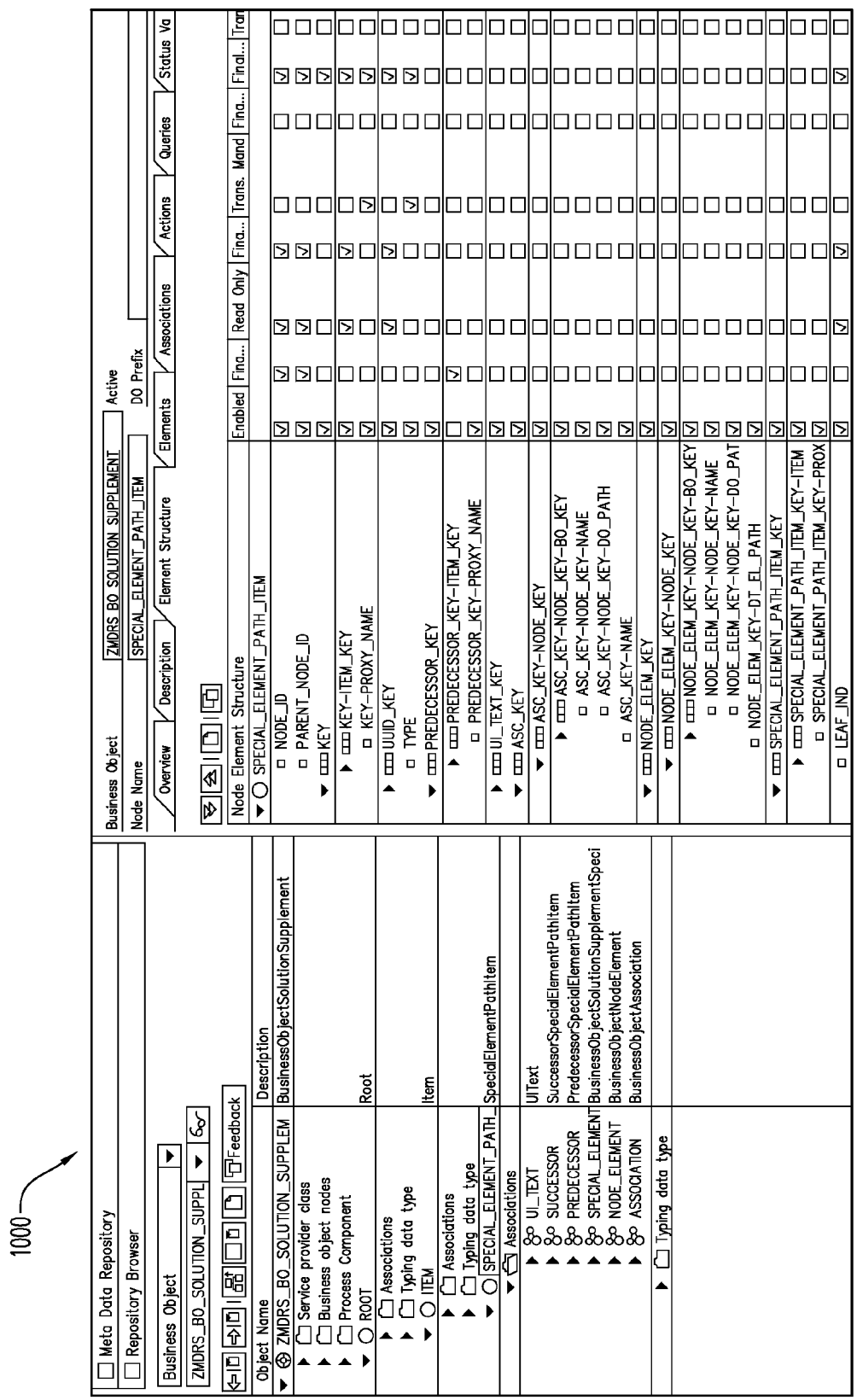
FIG. 10 is an outward view of a user interface showing a SpecialPathItem node of a solution supplement metaobject according to some embodiments.

FIG. 10 illustrates user interface 1000 presenting elements of a SpecialElementPathItem node of the Business Object Solution Supplement metaobject according to some embodiments. A special element path is a navigation path that joins entities of a node (e.g., node elements) to another node.

A special element path item is one part of a special element path that is built by associations, by a closing node element and/or by a further special element path item of a different special element path. The special element path item can be related to an association or to a node element in the case of end points of the path or to a special element path item of one other navigation path. The former case allows a type of special element path reuse. The kind of relationship is given by the type code of the special element path item.

The special element path item is assigned to a predecessor special element path item. If no predecessor is given, then the special element path is the starting point of one path for that item. Every special element path item of type "Business Object Association" can have one or more successors.

One special element path is build by traversing from one special element item to one of the successor special element path items starting with a special element without a predecessor and ending with a corresponding node element of the last special element path item or a target node of a corresponding association of the last special element path item.

Use In many cases all released elements of the target node of an association are visible in the BO explorer. Or in other words the same elements which are visible if you navigate via the composition association are also relevant if you navigate via another association. However, in several cases you need to restrict further dependent on which association you started to navigate with. This functionality allows for selecting special navigation paths, to improve understanding and for display in the BO explorer.

An element path is either directly an element of the target node of the association you start with, or it is an element of a node which can be reached via associations of the target node (or associations of their target nodes and so on). The same mechanism can also be used to specify exactly which parts of a DO are really to be released in a given BO and which UI-text is used. In case no UI text is specified in the special element path, the UI text of the element is valid.

The elements located at the node Special Element Path Item are defined by the data type: BusinessObjectSolutionSupplementSpecialPathElements. These elements include: Key (e.g., the key of the special element path item); SolutionSupplementKey (e.g., the key of the business object solution supplement to which the item belongs); NodeProxyName: (e.g., the proxy name of the business object node); ActionProxyName (e.g., the proxy name of the business object action); QueryProxyName (e.g., the proxy name of the business object query); AssociationProxyName (e.g., the proxy name of the business object association); DataTypeElementPathProxyName (e.g., the data element path of the element proxy names of the corresponding business object entity); Name: (e.g., the proxy name of the special element path item; and TypeCode (e.g., coded representation of the type of the business object special element path item).

The type of the business object special element path item specified by TypeCode controls the kind of navigation through the successor path item. Three types are contemplated, Business Object Node Element, Business Object Association, and Business Object Solution Supplement Special Element Path Item.

A Business Object Node Element-type special element path item is related to a business object node element. That business object can be different from the assigned business object of the business object solution supplement. This path item is always the last item of a path (i.e., no successor path item exists).

A Business Object Association-type special element path item is related to a business object association. That business object can be different from the assigned business object of the business object solution supplement. This path item can be a starting or ending point of a special element path. The entities of the target business object node of the related association will be joined to the corresponding node of the current item in case that the special element path item is the ending point of that special element path.

A Business Object Solution Supplement Special Element Path Item-type special element path item is related to a business object solution supplement special element path item. The business object solution supplement can be different from the current business object solution supplement, but it must be assigned to the same solution. This path item is always the last item of a path (i.e., no successor path item exists).

Figure 11:
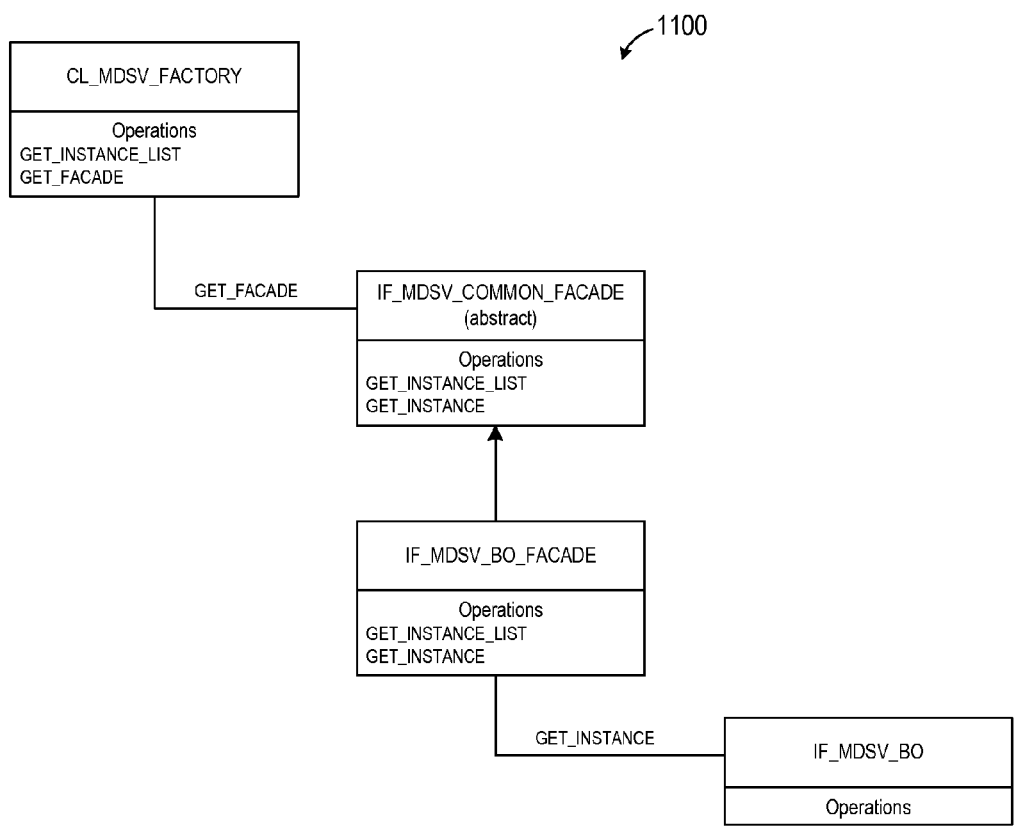
FIG. 11 illustrates classes of an application programming interface to obtain a business object view according to some embodiments.

FIG. 11 is an illustration 1100 of classes of an application programming interface (API) to obtain a business object view according to some embodiments. The API design is based on an instance API with a factory providing an access façade. The façade can be initialized with filter parameters. The interface instance provides drill-down read API methods. Many consumer-specific instances of façades can exist in one session. The façade is metaobject-type specific. For example, the Business Object metaobject façade provides the entire Business Object metadata including joint cross- Business Object metadata referenced by specialized paths.

The common entry point for all metaobject types is realized with one factory. The factory provides a list of all supported metaobject types for which solution-specific views are available. In addition, the name of the interface façade for each metaobject type will be provided in the list of solution views.

As mentioned above, the MDSV API provides a calculated Business Object View based on an evaluation of Business Object metadata and Business Object Solution Supplement metadata. The leading metadata entity is the Business Object and the Business Object Solution Supplements are only handled as additional information. The MDSV API is ABAP class-based according to some embodiments, but the MDSV API may be implemented in any programming language.

Referring to FIG. 11, the ABAP class CL_MDSV_FACTORY provides an access point to MDSV facades of metaobject types in the MDRS. The façades may be realized as ABAP interfaces.

The abstract ABAP interface IF_MDSV_COMMON_FACADE provides the common part of the metaobject façade. The interface IF_MSDV_BO_FACADE is derived from IF_MSDV_COMMON_FACADE. The interface IF_MSDV_BO_FACADE is the access point to the concrete MDSVs of the Business Objects. The concrete MDSV information of a Business Object is provided by the ABAP interface IF_MDSV_BO.

The CL_MDSV_FACTORY class forms a generic entry point of the solution view read API. Primarily, it provides two methods:

GET_FACADE_LIST: lists all supported metaobjects for which a solution view API is available in the system in terms of metaobject name, corresponding solution supplement name and the names of the corresponding metaobject/solution supplement specific interface names of the façade.

GET_FACADE: returns the access façade for a specific metaobject as an implementation of interface

IF_MDSV_COMMON_FACADE/IF_MDRS_COMMON_[<MO_NAME>].

The façade IF_MDSV_COMMON_FACADE provides access to the metaobject-specific solution view read API and to apply particular filter parameters on this read API (e.g., the solution name, detailed parameters on how to explode the MO structure with the solution supplement).

The interface IF_MDSV_BO_FACADE includes the common interface IF_MDRS_COMMON_INTERFACE and can add metaobject-specific functionality such as providing a list of metaobject instance-based filter criteria (e.g., solution).

The interface IF_MDSV_BO defines the drill-down methods required to explode the metadata solution view on the Business Object metaobject. Each interface instance is created using the filter parameters set when invoking the GET_INSTANCE method of the façade, so the filter parameters need not be passed with each method call.

An explanation of relevant methods now follows. The explanation concerns Business Object metaobjects, but embodiments may be used in conjunction with other metaobjects. Initially, it is assumed that a request for metadata of an instance of a metaobject is received, and that the request includes a name of the instance (e.g., SalesOrder), a filter parameter setting and a solution.

GET_ROOT

This method returns a Business Object root instance and a root instance of a corresponding Business Object Solution Supplement as specified by the Business Object ABAP/proxy name.

```
TYPES:
    BEGIN OF ty_gs_root,
        mo_root                 TYPE
                                if_mdrs_business_object=>ty_root,
        solution_suppl_root     TYPE zif_mdrs_bo_sol_sup=>ty_root,
    END OF ty_gs_root .
TYPES:
    ty_gt_root                  TYPE STANDARD TABLE OF
                                ty_gs_root.
METHODS get_root
    IMPORTING
        !iv_bo_name TYPE if_mdrs_business_object=>ty_key-root-key-
        name
    EXPORTING
        !es_root    TYPE ty_gs_root .
```

GET_ROOT_LIST

This method returns a list of Business Object root instances and corresponding Business Object BO solution supplement root instances according to the filter parameter setting and the requested solution.

GET_ROOT_NODE

This method returns the root node instance of a given Business Object and a corresponding item instance of the Solution Supplement metaobject.

```
TYPES:
    ty_gt_path              TYPE STANDARD TABLE OF
                            if_mdrs_business_object=>
                            ty_key-association-key
                            WITH DEFAULT KEY .
TYPES:
    BEGIN OF ty_gs_node,
        mo_node             TYPE if_mdrs_business_object=>
                            ty_node,
        solution_suppl_item TYPE zif_mdrs_bo_sol_sup=>ty_item,
        path                TYPE ty_gt_path,
    END OF ty_gs_node .
TYPES:
    ty_gt_node              TYPE STANDARD TABLE OF
                            ty_gs_node .
METHODS get_root_node
    IMPORTING
        !iv_bo_name         TYPE zif_mdrs_business_object=>
ty_key-root-key-name
    EXPORTING
        !es_root_node       TYPE ty_gs_node .
```

GET_SUBNODES

This method allows drilling down the node hierarchy based on the filter parameters. Starting from a parent node instance, the child nodes within the solution view are calculated. The method returns a set of child nodes based on the instance of the Business Object node, Item instances of the corresponding Business Object Solution Supplement, and path information formed by the sequence of association keys connecting the parent node with the child nodes.

Path information introduced within the GET_SUBNODES method is relevant for the following methods as well, since a child in the solution view may result from a metaobject instance found along a path composed of a set of associations, or a child can be reached by multiple associations (e.g., party-buyer or seller-party associations). Through knowledge of the Business Object metaobject source instance, the Business Object metaobject target instance (i.e., child in the solution view), and the path given by the list of association keys, the information is completely available to the consumer.

```
METHODS get_subnodes
    IMPORTING
        !iv_node_key TYPE if_mdrs_business_object=>ty_key-node-key
    EXPORTING
        !et_node TYPE ty_gt_node .
```

GET_NODE_TOP_LEVEL_ELEMENTS

This method returns a set of top level node elements of a Business Object node and corresponding item instances of the Business Object Solution Supplement metaobject. Due to the requested structure compression, a top level node element may result from a node instance, found by an association or association chain. The method returns a table with a structure consisting of the Business Object node element, a corresponding Solution Supplement item and the path.

GET_NODE_SUB_ELEMENTS

This method returns the set of child node elements of a node element. This method also returns corresponding item instances of the Business Object Solution Supplement metaobject. Since the data type hierarchy is represented in the Key of the Business Object node element, this part of the hierarchy is not redundantly represented in the path.

The following methods relate to other elements in the Business Object metaobject, and may be applied to those elements analogously to the methods described above:

```
GET_ACTIONS
GET_ACTION_TOP_LEVEL_PARAMS
GET_ACTION_SUB_PARAMS
GET_QUERIES
GET_QUERY_TOP_LEVEL_PARAMS
GET_QUERY_SUB_PARAMS
GET_ASSOCS
GET_ASSOC_TOP_LEVEL_PARAMS
GET_ASSOC_SUB_PARAMS
```

Figure 12:
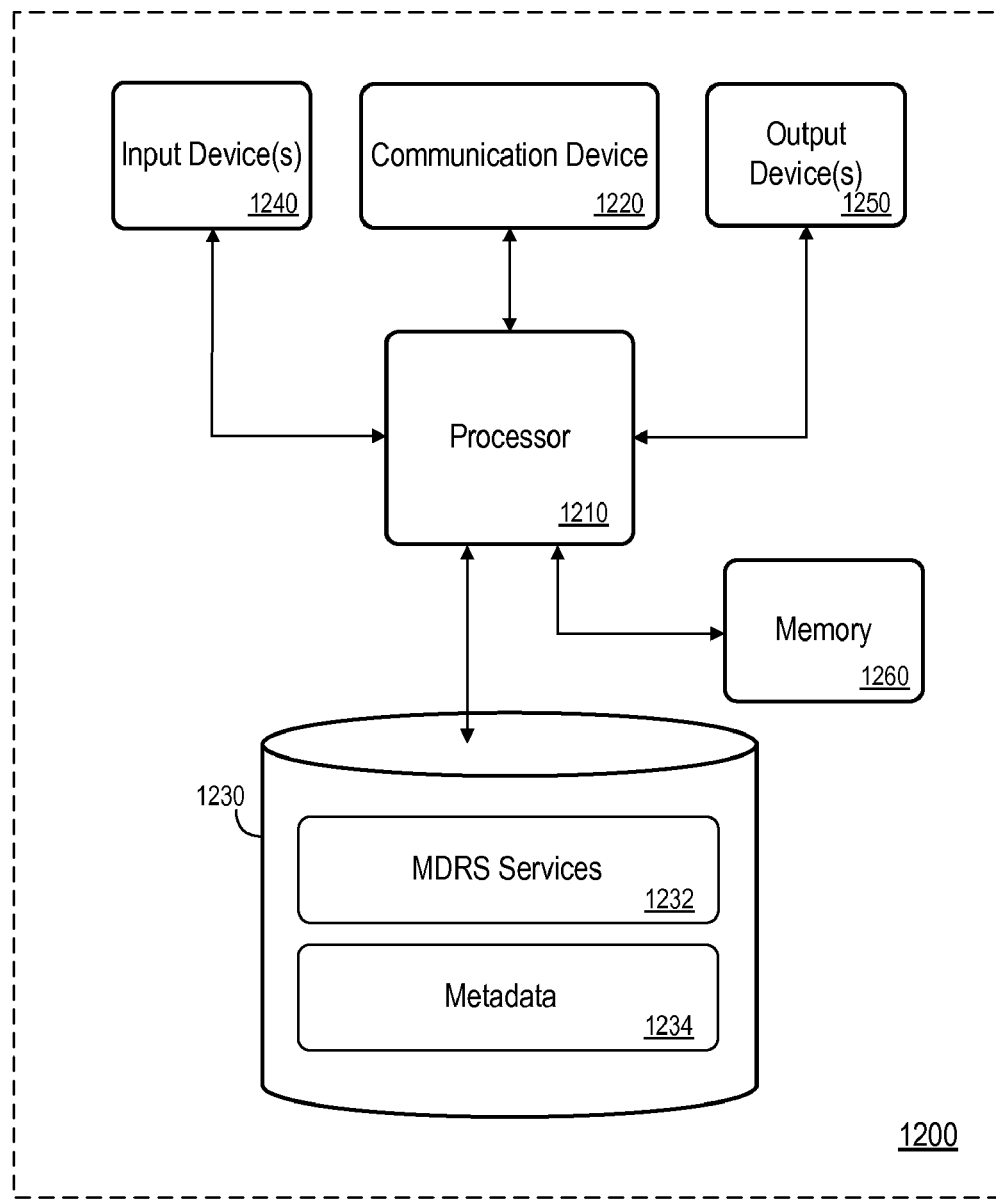
FIG. 12 is a functional block diagram of an apparatus according to some embodiments.

FIG. 12 is a block diagram of apparatus 1200 according to some embodiments. Apparatus 1200 may comprise a general-purpose computing apparatus and may execute program code to perform any of the functions described herein. Apparatus 1200 may comprise an implementation of MDRS 110. Apparatus 1200 may include other unshown elements according to some embodiments.

Apparatus 1200 includes processor 1210 operatively coupled to communication device 1220, data storage device 1230, one or more input devices 1240, one or more output devices 1250 and memory 1260.

Communication device 1220 may facilitate communication with external devices, such as an external design tool. Input device(s) 1240 may comprise, for example, a keyboard, a keypad, a mouse or other pointing device, a microphone, knob or a switch, an infra-red (IR) port, a docking station, and/or a touch screen. Input device(s) 1240 may be used, for example, to enter information into apparatus 1200. Output device(s) 1250 may comprise, for example, a display (e.g., a display screen) a speaker, and/or a printer.

Data storage device 1230 may comprise any appropriate persistent storage device, including combinations of magnetic storage devices (e.g., magnetic tape, hard disk drives and flash memory), optical storage devices, Read Only Memory (ROM) devices, etc., while memory 1260 may comprise Random Access Memory (RAM).

MDRS services 1232 of data storage device 1230 includes program code for execution by processor 1210 to provide functions attributed herein to MDRS services 114. Embodiments are not limited to execution of these functions by a single apparatus. Metadata 1234 may include metadata defining metaobjects (e.g., Business Object, Business Object Solution Supplement) and instances thereof (e.g., SalesOrder) as described herein. Data storage device 1230 may also store data and other program code for providing additional functionality and/or which are necessary for operation thereof, such as device drivers, operating system files, etc.

Each system and device described herein may be implemented by any number of devices in communication via any number of other public and/or private networks. Two or more of devices of may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media. Such media may include, for example, a floppy disk, a CD-ROM, a DVD-ROM, a Flash drive, magnetic tape, and solid state RAM or ROM memories. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A computer-implemented metadata repository comprising:
   one or more storage devices storing:
      first metadata defining an instance of a first metaobject, wherein the first metaobject is an instance of a meta-metaobject;
      second metadata defining an instance of a solution supplement metaobject that is separate from the instance of the first metaobject, wherein the instance of the solution supplement metaobject comprises annotations to the instance of the first metaobject, and wherein the solution supplement metaobject is an instance of the same meta-metaobject of which the first metaobject is an instance; and
      executable program code of a service to determine merged metadata that is a subset of the first metadata defining the instance of the first metaobject based on: (i) the first metadata defining the instance of the first metaobject and (ii) the annotations of the instance of the solution supplement metaobject that is separate from the instance of the first metaobject and an instance of the same meta-metaobject of which the first metaobject is an instance; and
   a processor that executes the executable program code;
   wherein the request for first metadata of the instance of the first metaobject includes a name of the instance of the first metaobject, a filter parameter setting and a solution, and
   wherein the code to determine the merged metadata comprises:
      code to determine a root instance of the instance of the first metaobject and a root instance of the instance of the solution supplement metaobject as specified by the name of the instance of the first metaobject;
      code to determine a list of root instances of the instance of the first metaobject and root instances of the instance of the solution supplement metaobject according to the filter parameter setting and the solution;
      code to determine a root node instance of the instance of the first metaobject and an item instance of the instance of the solution supplement metaobject corresponding to the root node instance;
      code to determine a set of child nodes based on a parent node instance of the instance of the first metaobject, an item instance of the instance of the solution supplement metaobject corresponding to the parent node instance, and path information formed by a sequence of association keys connecting the parent node with the child nodes;
      code to determine a set of top level node elements of a node of the instance of the first metaobject and corresponding item instances of the instance of the solution supplement metaobject; and
      code to determine a set of child node elements of a node element and corresponding item instances of the instance of the solution supplement metaobject.

2. A metadata repository according to claim 1, the one or more storage devices further storing:
   third metadata defining an instance of a solution metaobject, wherein the solution metaobject is an instance of the meta-metaobject,
   and wherein the service to determine merged metadata determines the merged metadata based on the first metadata, the annotations, and the instance of the solution metaobject.

3. A metadata repository according to claim 2, the one or more storage devices further storing:
   fourth metadata defining an instance of a user interface text metaobject, wherein the user interface text metaobject is an instance of the meta-metaobject,
   and wherein the service to determine merged metadata determines the merged metadata based on the first metadata, the annotations, the instance of the solution metaobject and the instance of the user interface text metaobject.

4. A metadata repository according to claim 1, the one or more storage devices further storing:
   third metadata defining an instance of a user interface text metaobject, wherein the user interface text metaobject is an instance of the meta-metaobject,
   and wherein the service to determine merged metadata determines the merged metadata based on the first metadata, the annotations, and the instance of the user interface text metaobject.

5. A metadata repository according to claim 1, wherein the second metadata defines:
   a respective item node associated with each of: an association entity of the instance of the first metaobject; a node entity of the instance of the first metaobject; a node element entity of the instance of the first metaobject; an action entity of the instance of the first metaobject; and a query entity of the instance of the first metaobject,
   wherein each item node includes annotations for only one entity of the instance of the first metaobject.

6. A metadata repository according to claim 1, wherein the annotations of the instance of the solution supplement metaobject that is separate from the instance of the first metaobject and an instance of the same meta-metaobject of which the first metaobject is an instance comprise:
   a relevant for solution indicator defining whether the element is published for customers of a given solution; and a definition of a special element path based on associations to a cross-business object node or cross-business object node element.

7. A computer-readable medium storing processor-executable program code, the program code comprising:
   code to receive a request for first metadata of an instance of a first metaobject, wherein the first metaobject is an instance of a meta-metaobject;
   code to identify an instance of a solution supplement metaobject that is separate from the instance of the first metaobject, wherein the instance of the solution supplement metaobject is associated with the instance of the first metaobject and comprises annotations to the instance of the first metaobject, and wherein the solution supplement metaobject is an instance of the same meta-metaobject of which the first metaobject is an instance; and
   code to determine merged metadata that is a subset of the first metadata defining the instance of the first metaobject based on: (i) the first metadata defining the instance of the first metaobject and (ii) the annotations of the instance of the solution supplement metaobject that is separate from the instance of the first metaobject and an instance of the same meta-metaobject of which the first metaobject is an instances:
   wherein the request for first metadata of the instance of the first metaobject includes a name of the instance of the first metaobject, a filter parameter setting and a solution, and
   wherein the code to determine the merged metadata comprises:
      code to determine a root instance of the instance of the first metaobject and a root instance of the instance of the solution supplement metaobject as specified by the name of the instance of the first metaobject;
      code to determine a list of root instances of the instance of the first metaobject and root instances of the instance of the solution supplement metaobject according to the filter parameter setting and the solution;
      code to determine a root node instance of the instance of the first metaobject and an item instance of the instance of the solution supplement metaobject corresponding to the root node instance;
      code to determine a set of child nodes based on a parent node instance of the instance of the first metaobject, an item instance of the instance of the solution supplement metaobject corresponding to the parent node instance, and path information formed by a sequence of association keys connecting the parent node with the child nodes;
      code to determine a set of top level node elements of a node of the instance of the first metaobject and corresponding item instances of the instance of the solution supplement metaobject; and
      code to determine a set of child node elements of a node element and corresponding item instances of the instance of the solution supplement metaobject.

8. A computer-readable medium according to claim 7, the program code further comprising:
   code to identify a solution associated with the request,
   wherein the code to determine the merged metadata comprises code to determine the merged metadata based on the first metadata, the annotations, and the solution.

9. A computer-readable medium according to claim 7, the program code further comprising:
   code to identify an instance of a user interface text metaobject associated with the instance of the solution supplement metaobject, wherein the user interface text metaobject is an instance of the meta-metaobject,
   wherein the code to determine the merged metadata comprises code to determine the merged metadata based on the first metadata, the annotations, the solution and the instance of the user interface text metaobject.

10. A computer-readable medium according to claim 7, wherein the instance of the solution supplement metaobject defines:
   a respective item node associated with each of: an association entity of the instance of the first metaobject, a node entity of the instance of the first metaobject, a node element entity of the instance of the first metaobject, an action entity of the instance of the first metaobject, and a query entity of the instance of the first metaobject,
   wherein each item node in the second metadata includes annotations for only one entity of the instance of the first metaobject.

11. A computer-readable medium according to claim 7, wherein the annotations of the instance of the solution supplement metaobject that is separate from the instance of the first metaobject and an instance of the same meta-metaobject of which the first metaobject is an instance comprise:
   a relevant for solution indicator defining whether the element is published for customers of a given solution; and
   a definition of a special element path based on associations to a cross-business object node or cross-business object node element.

12. A method comprising:
   receiving, by a processor, a request for first metadata of an instance of a first metaobject, wherein the first metaobject is an instance of a meta-metaobject;
   identifying, by a processor, an instance of a solution supplement metaobject that is separate from the instance of the first metaobject, wherein the instance of the solution supplement metaobject is associated with the instance of the first metaobject and comprises annotations to the instance of the first metaobject, and wherein the solution supplement metaobject is an instance of the same meta-metaobject of which the first metaobject is an instance; and
      determining, by a processor, merged metadata that is a subset of the first metadata defining the instance of the first metaobject based on: (i) the first metadata defining the instance of the first metaobject and (ii) the annotations of the instance of the solution supplement metaobject that is separate from the instance of the first metaobject and an instance of the same meta-metaobject of which the first metaobject is an instance;
   wherein the request for first metadata of the instance of the first metaobject includes a name of the instance of the first metaobject, a filter parameter setting and a solution, and
   wherein the determining the merged metadata comprises:
      determining a root instance of the instance of the first metaobject and a root instance of the instance of the solution supplement metaobject as specified by the name of the instance of the first metaobject;
      determining a list of root instances of the instance of the first metaobject and root instances of the instance of the solution supplement metaobject according to the filter parameter setting and the solution;

determining a root node instance of the instance of the first metaobject and an item instance of the instance of the solution supplement metaobject corresponding to the root node instance;

determining a set of child nodes based on a parent node instance of the instance of the first metaobject, an item instance of the instance of the solution supplement metaobject corresponding to the parent node instance, and path information formed by a sequence of association keys connecting the parent node with the child nodes;

determining a set of top level node elements of a node of the instance of the first metaobject and corresponding item instances of the instance of the solution supplement metaobject; and determining a set of child node elements of a node element and corresponding item instances of the instance of the solution supplement metaobject.

13. A method according to claim 12, wherein the annotations of the instance of the solution supplement metaobject that is separate from the instance of the first metaobject and an instance of the same meta-metaobject of which the first metaobject is an instance comprise:

a relevant for solution indicator defining whether the element is published for customers of a given solution; and a definition of a special element path based on associations to a cross-business object node or cross-business object node element.

14. A method according to claim 12, wherein the receiving, by a processor, a request for first metadata of an instance of a first metaobject, comprises:

receiving, by a first processor, the request for first metadata of the instance of the first metaobject,;

wherein the identifying, by a processor, an instance of a solution supplement metaobject that is separate from the instance of the first metaobject comprises:

identifying, by the first processor, the instance of the solution supplement metaobject that is separate from the instance of the first metaobject; and wherein the determining, by a processor, merged metadata comprises:

determining, by the first processor, the merged metadata that is a subset of the first metadata defining the instance of the first metaobject.

15. A method according to claim 14, wherein the annotations of the instance of the solution supplement metaobject that is separate from the instance of the first metaobject and an instance of the same meta-metaobject of which the first metaobject is an instance comprise:

a relevant for solution indicator defining whether the element is published for customers of a given solution; and a definition of a special element path based on associations to a cross-business object node or cross-business object node element.

16. A computer-implemented metadata repository comprising:

one or more storage devices storing:

first metadata defining an instance of a first metaobject, wherein the first metaobject is an instance of a meta-metaobject;

second metadata defining an instance of a solution supplement metaobject, wherein the second metadata comprises annotations to the first metadata, and wherein the solution supplement metaobject is an instance of the meta-metaobject; and executable program code of a service to determine merged metadata based on the first metadata and the annotations to the first metadata; and a processor that executes the executable program code;

wherein the request for first metadata of the instance of the first metaobject includes a name of the instance of the first metaobject, a filter parameter setting and a solution, and wherein the executable program code to determine the merged metadata comprises:

executable program code to determine a root instance of the instance of the first metaobject and a root instance of the instance of the solution supplement metaobject as specified by the name of the instance of the first metaobject;

executable program code to determine a list of root instances of the instance of the first metaobject and root instances of the instance of the solution supplement metaobject according to the filter parameter setting and the solution;

executable program code to determine a root node instance of the instance of the first metaobject and an item instance of the instance of the solution supplement metaobject corresponding to the root node instance;

executable program code to determine a set of child nodes based on a parent node instance of the instance of the first metaobject, an item instance of the instance of the solution supplement metaobject corresponding to the parent node instance, and path information formed by a sequence of association keys connecting the parent node with the child nodes;

executable program code to determine a set of top level node elements of a node of the instance of the first metaobject and corresponding item instances of the instance of the solution supplement metaobject; and executable program code to determine a set of child node elements of a node element and corresponding item instances of the instance of the solution supplement metaobject.

17. A computer-readable medium storing processor-executable program code, the program code comprising:

code to receive a request for first metadata of an instance of a first metaobject, wherein the first metaobject is an instance of a meta-metaobject;

code to identify an instance of a solution supplement metaobject, wherein the instance of the solution supplement metaobject is associated with the instance of the first metaobject and comprises annotations to the first metadata, and wherein the solution supplement metaobject is an instance of the meta-metaobject; and code to determine merged metadata based on the first metadata and the annotations to the first metadata;

wherein the request for first metadata of the instance of the first metaobject includes a name of the instance of the first metaobject, a filter parameter setting and a solution, and wherein the code to determine the merged metadata comprises:

code to determine a root instance of the instance of the first metaobject and a root instance of the instance of the solution supplement metaobject as specified by the name of the instance of the first metaobject;

code to determine a list of root instances of the instance of the first metaobject and root instances of the instance of the solution supplement metaobject according to the filter parameter setting and the solution;

code to determine a root node instance of the instance of the first metaobject and an item instance of the instance of the solution supplement metaobject corresponding to the root node instance;

code to determine a set of child nodes based on a parent node instance of the instance of the first metaobject, an item instance of the instance of the solution supplement metaobject corresponding to the parent node instance, and path information formed by a sequence of association keys connecting the parent node with the child nodes;

code to determine a set of top level node elements of a node of the instance of the first metaobject and corresponding item instances of the instance of the solution supplement metaobject; and code to determine a set of child node elements of a node element and corresponding item instances of the instance of the solution supplement metaobject.

18. A method comprising:

receiving, by a processor, a request for first metadata of an instance of a first metaobject, wherein the first metaobject is an instance of a meta-metaobject;

identifying, by a processor, an instance of a solution supplement metaobject, wherein the instance of the solution supplement metaobject is associated with the instance of the first metaobject and comprises annotations to the first metadata, and wherein the solution supplement metaobject is an instance of the meta-metaobject; and determining, by a processor, merged metadata based on the first metadata and the annotations to the first metadata;

wherein the request for first metadata of the instance of the first metaobject includes a name of the instance of the first metaobject, a filter parameter setting and a solution, and wherein the determining the merged metadata comprises:

determining a root instance of the instance of the first metaobject and a root instance of the instance of the solution supplement metaobject as specified by the name of the instance of the first metaobject;

determining a list of root instances of the instance of the first metaobject and root instances of the instance of the solution supplement metaobject according to the filter parameter setting and the solution;

determining a root node instance of the instance of the first metaobject and an item instance of the instance of the solution supplement metaobject corresponding to the root node instance;

determining a set of child nodes based on a parent node instance of the instance of the first metaobject, an item instance of the instance of the solution supplement metaobject corresponding to the parent node instance, and path information formed by a sequence of association keys connecting the parent node with the child nodes;

determining a set of top level node elements of a node of the instance of the first metaobject and corresponding item instances of the instance of the solution supplement metaobject; and determining a set of child node elements of a node element and corresponding item instances of the instance of the solution supplement metaobject.

* * * * *